United States Patent [19]

Clements et al.

[11] Patent Number: 4,764,906
[45] Date of Patent: Aug. 16, 1988

[54] PLASMA JET UNDERWATER ACOUSTIC SOURCE

[75] Inventors: Reginald M. Clements; Philip L. Pitt; John D. Ridley, all of Victoria, Canada; Robert Smith, Paradise, Calif.; David Topham, Victoria, Canada

[73] Assignee: University of Victoria, Victoria, Canada

[21] Appl. No.: 99,344

[22] Filed: Sep. 17, 1987

[30] Foreign Application Priority Data

Feb. 20, 1987 [CA] Canada ................................. 530288

[51] Int. Cl.$^4$ ............................................. G01V 1/06
[52] U.S. Cl. .................................. 367/142; 367/147; 181/118
[58] Field of Search ................ 367/142, 147; 181/117, 181/118

[56] References Cited

U.S. PATENT DOCUMENTS

| | | |
|---|---|---|
| 3,458,858 | 7/1969 | Wright . |
| 3,537,542 | 11/1970 | Dubois . |
| 4,039,042 | 8/1977 | Edwards et al. . |
| 4,040,000 | 8/1977 | Dwivedi . |
| 4,703,463 | 10/1987 | Izard . |

*Primary Examiner*—Charles T. Jordan
*Assistant Examiner*—John W. Eldred
*Attorney, Agent, or Firm*—Harry M. Weiss & Associates

[57] ABSTRACT

A novel device and method are provided herein for the production of underwater sound. This device, termed a plasma jet underwater acoustic source includes a central electrode and a concentric insulator having a longitudinal bore to accommodate the central electrode, the bore being spaced from the central electrode by a longitudinally-extending annular chamber. A plasma cavity is bounded at its upper end by the central electrode, and is in communication with the annular chamber. The cavity is adapted to be connected to a gas supply, so that it may be filled with gas. An outer housing of electrically-conductive material surrounds the insulator and terminates in a centrally-apertured end plate whose central aperture provides an extension to the plasma cavity, the end plate being adapted to be grounded. Connectors are provided for connecting the central electrode first to a source of low energy and high voltage to create an electrical discharge across the gas within the plasma cavity and then to a source of stored electrical energy of comparatively low voltage, e.g. in the range of hundreds of volts. An electrical discharge between the inner conductor and the grounded annular end plate thus causes the gas in the cavity to heat rapidly. The resulting overpressure expels the gas initially at supersonic speeds into the water. The ejected gas from the cavity forms a compression zone, a bubble, and a plasma plume, the compression zone producing the acoustic pulse.

19 Claims, 6 Drawing Sheets

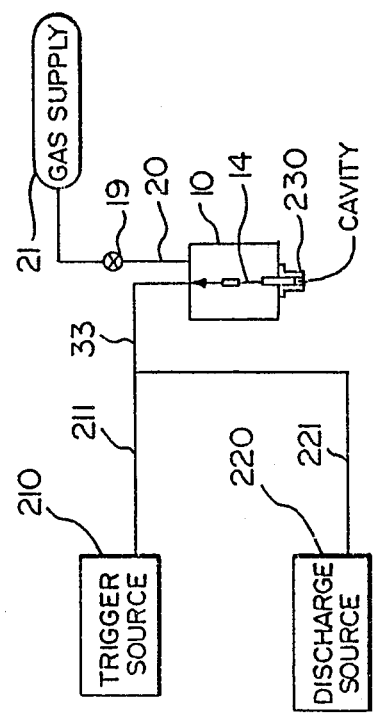
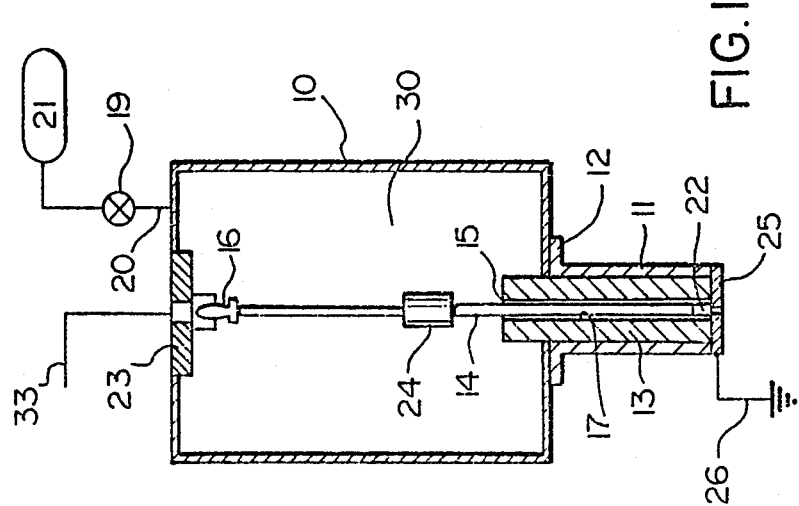
FIG. 2
FIG. 1

PLASMA JET UNDERWATER ACOUSTIC SOURCE

BACKGROUND OF THE INVENTION (i) Field of the Invention

This invention relates to a device and method for the production, by electrical means, of a sound source suitable for marine applications.

(ii) Description of the Prior Art

Underwater electrical acoustic sources have been used in the past with limited success. Present technology of underwater spark sources requires extremely high voltages in order to electrically break down water. Use of such high voltages is not desirable on board ship. Moreover, conventional spark sources are highly inefficient in converting electrical energy into sound energy.

In addition to conventional electrostrictive and magnetostrictive acoustic sources, spark gaps, thumpers (boomers), and explosives have been used at energies typically in the range of 10–20 KJ. The spark gap sources require voltages of 15–30 KV. Such voltage is required because of the high breakdown voltage of sea water (100–200 KV/cm). Thumper sources were developed as a source of low frequency acoustic energy requiring much lower operating voltages (typically 4 KV). These devices, with efficiencies of 10%, gained preference over spark gap sources primarily on the grounds of safety. Explosives are high energy (megajoule), one-shot sources, and their main drawback is lack of repeatability.

Acoustic spectra of typical spark sources indicate that the acoustic energy is radiated from low frequencies of 100 Hz to a peak at less than 10 KHz. The main parameter affecting the spectra is the rate at which the energy is supplied to the spark gap. The primary conclusion is the spark gap sources closely resemble small (milligram of TNT) explosive sources. Spark sources have not, however, received much attention because of the potential hazard of high voltages.

The patent literature is replete with such devices. For example, Canadian Pat. No. 699,875, patented Dec. 15, 1964, by N. D. Smith, Jr. is directed to a seismic surveying system for water covered areas. The sound source is an extended linear sound source to generate seismic waves in the body of water. Such source is provided with a firing apparatus for igniting or detonating an explosive mixture of gas contained within an elongated flexible member.

Canadian Pat. No. 804,172, patented Jan. 14, 1969, by P. H. Miller, Jr. is directed to an analogue device for geophysical prospecting. The signal generator includes a hollow cylindrical body containing a gas, and means to produce acoustic discontinuities in the gas. Such means is therefore a transducer to generate acoustical waves in the gas.

Canadian Pat. No. 808,298, patented Mar. 11, 1969, by W. A. Kearsley et al is directed to an underground sound-producing system. Such system is of the unmerged sparker type in which a high voltage electrode is spaced from a second electrode by a distance slightly greater than the radius of the plasma bubble produced by the energization of the first electrode.

Canadian Pat. No. 836,712, patented Mar. 10, 1970 by W. H. Luehrmann et al is directed to an apparatus for generating an underwater acoustical impulse. The apparatus includes spacedapart electrodes and contains conductive particles or metallic wires in the region between the electrodes, so that, when stored electrical energy is passed through the region, the metal will vaporize and provide an increased concentration of ions in the plasma region.

Canadian Pat. No. 1,112,349, patented Nov. 10, 1981, by R. A. Kirby is directed to an open ended seismic source. The source is an air gun provided with means for abruptly increasing the pressure of gas in a chamber so that some gas escapes from the chamber to create the pulse. The air gun is also provided with a recoil reducing structure.

Canadian Pat. No. 1,129,980, patented Aug. 17, 1982 by R. C. Johnson et al is directed to an air-release control in a seismic energy source air gun. The air gun has two compressed air chambers and shuttle means for releasing compressed air between the chambers and out into the medium.

Krott et al, U.S. Pat. No. 3,245,032, patented Apr. 5, 1966 provides a structure to give an improved multishot acoustic spark source, using a plurality of electrodes, in the absence of a supply a gas.

Kearsley et al, U.S. Pat. No. 3,268,226, patented Nov. 15, 1966 provides an underwater sound source of the unmerged sparker type of a specially recited construction having two electrodes.

Huckabay et al, U.S. Pat. No. 3,304,533, patented Feb. 14, 1967 provides an acoustic source for marine seismic surveying in which two electrodes are placed in a body of water and a series of potentials is imposed across the electrodes to build up the pressure wave.

Berglund et al, U.S. Pat. No. 3,368,643, patented Feb. 13, 1968 provides an electric arc seismic source involving the use of a stream of water and a metallized path between two electrodes.

Luehrmann et al, U.S. Pat. No. 3,369,218, patented Feb. 13, 1968 provides a metallized plasma path source involving the use of a stream of a conductive liquid.

Wright, Jr., U.S. Pat. No. 3,458,858, patented July 29, 1969 provides an acoustic generator of the spark discharge type in which a gas bubble is disposed between two electrodes so that the electric discharge takes place across the bubble. The patentee creates a discharge in a gaseous environment. In the patented device, an attempt is made to place a bubble strategically between the two electrodes at the exact time of electrical switching.

Burrage, U.S. Pat. No. 3,613,823, patented Oct. 19, 1971 provides a double bubble spark array in which the usual ground electrode is replaced by a plurality of parallel electrodes.

Kirby, U.S. Pat. No. 4,193,472, patented Mar. 18, 1980 provides an open ended seismic source involving the use of an explosive chamber fed with an explosive gas and ignited by a capacitance discharge ignition system.

SUMMARY OF THE INVENTION (i) Aims of the Invention

Accordingly there is a requirement in the field of underwater exploration for a repeatable underwater sound source which can be tailored to give a programmed range of acoustical frequencies. An object of this invention is to provide a broad spectrum, acoustic source for a single shot use over a range of energies ($1$–$10^3$ J) or at repetition rates of up to 1 KHz for synthesizing a long acoustical pulse for use in exploration of the ocean bottom. Such a device could also have use in navigation of ships, location of fish and other targets, hydrographic surveys, civil engineering, oil and geophysical research, exploration of sediments and rocks in the sea, the study of marine life, and for data transmission.

Another object of this invention is the provision of such a device operable at a relatively low voltage (e.g. from 0.8 KV to 5.0 KV).

Yet another object of this invention is the provision of such a device which has greater efficiency than devices heretofore used.

(ii) Statements of Invention

By the present invention, a plasma jet source is provided for a plasma jet underwater acoustic source, the plasma jet source comprising: (a) a central electrode; (b) a concentric insulator having a longitudinal bore to accomodate the central electrode, the bore being spaced from the central electrode by a longitudinally-extending, annular chamber; (c) a plasma cavity bounded at its upper end by the central electrode, the plasma cavity being in communication with the annular chamber; (d) an outer housing of electrically-conductive material surrounding the insulator and terminating in a centrally-apertured end plate whose central aperture provides an extension to the plasma cavity, the end plate being adapted to be grounded; (e) means for connecting the annular chamber to a source of gas; and (f) means for connecting the central electrode first to a source of low energy and high voltage to create an electrical discharge across the gas within the cavity, and then for connecting the electrode to electrical energy of comparatively low voltage in the range of hundreds of volts.

This invention also provides a plasma jet underwater acoustic source is provided comprising: (a) a central electrode; (b) a concentric insulator having a longitudinal bore to accomodate the central electrode, the bore being spaced from the central electrode by a longitudinally extending annular chamber; (c) a plasma cavity bounded at its upper end by the central electrode, the plasma cavity being in communication with the annular chamber; (d) an outer housing of electrically-conductive material surrounding the insulator and terminating in a centrally-apertured end plate whose central aperture provides an extension to the plasma cavity, the end plate being adapted to be grounded; (e) means for connecting the annular chamber to a source of gas; and (f) a trigger pulse source comprising a low energy high voltage trigger pulse to induce gas breakdown in the plasma cavity, and a discharge source of a lower voltage higher energy discharge comprising a low voltage storage capacitor, to produce a fully developed arc, the trigger pulse source and the discharge source being electrically connected to the central electrode.

This invention also provides a method for the production of underwater sound, which method comprises: (a) providing a source of gas in a confined single open ended plasma cavity bounded at one end by an electrical electrode and at the other end by an apertured grounded washer; (b) applying a low energy and high voltage field across the electrode and the grounded washer to create an electrical discharge across the gas; and (c) then applying a low voltage electric field across the electrode and the grounded washer to subject the gas to an overpressure to expel the gas initially at supersonic speeds from the cavity whereby the ejected gas forms a compression zone, a bubble and a plasma plume, the compression zone producing an acoustic pulse.

(iii) Other Features of the Invention

By one feature of the plasma jet source of this invention, means are included for adjusting the length of the electrode within the concentric insulator, thereby to vary the length of the plasma cavity. Such means preferably comprises an internally-threaded coupling connecting a threaded end of the electrode to an electrical connector, whereby rotation of the coupling moves the electrode up-and-down.

By another feature of the plasma jet source of this invention, a main hollow outer body is provided which is connected to a source of gas, so that the gas may flow to the annular chamber from the main hollow outer body. The electrode is preferably connected to an electrical connector which terminates in a banana plug within the hollow outer body, so that the electrical connector may be electrically connected to the source of electricity.

By still another feature of the plasma jet source of this invention, the central electrode preferably is made of a refractory electrically-conductive metal of cylindrical shape, e.g. copper, steel, aluminum, etc., while the concentric insulator may be formed of glass, ceramic, nylon, ceramic/glass, alumina/glass, quartz/glass or polytetrafluoroethylene (TEFLON—Registered Trade Mark), with TEFLON being the preferred material for use in a salt water environment and is preferably also of cylindrical shape. The gas should be air, or any non-reactive gas, e.g. nitrogen, and the outer housing preferably is formed of a non-corrosive metal, e.g. stainless steel.

By another feature of the plasma jet underwater acoustic source of this invention, the source of pulsed, comparatively low voltage is adapted to generate a voltage of 0.8 to 5 KV. The trigger pulse is adapted to produce a high voltage (10's of KV), short duration (10 us) low energy (<1 Joule) discharge.

By yet another feature of the plasma jet underwater acoustic source of this invention, the discharge source is adapted to produce a lower voltage, higher energy (100's Joules) discharge source, and preferably comprises a plurality of storage capacitors. The discharge source is preferably protected from the trigger source by a blocking inductor or diode.

By still another feature of the plasma jet underwater acoustic source of this invention, such source is operable either at a single shot use over a range of energies of $1-10^3$ J or at repetitive rate of up to 2 KHz.

By a further feature of the plasma jet underwater acoustic source of this invention, a mounting structure is preferably included to contain the entire plasma jet source and all or part of the electrical system and thereby to provide a protective barrier between the plasma jet underwater acoustic source and the marine environment and to allow the supply of gas into the plasma cavity.

By a feature of the method of this invention, the low energy, high voltage electric field is preferably a high voltage (10's of KV), short duration (10 us) low energy (<1 Joule) electrical energy. The low voltage electric field preferably is a lower voltage (0.8 to 5 KV), higher energy ($1-10^3$ Joules) discharge source.

(iv) Generalized Description of the Invention

The plasma jet underwater acoustic source (sometimes abbreviated PJUAS) of this invention in its simplest form consists of the following components:

1. The plasma jet source, which consists of:

a. A central electrode made of refractory metal of a cylindrical shape.

b. A cylindrical insulator with a hole down its longitudinal axis to allow for passage of the central electrode. The diameter of the hole is slightly larger than the central electrode to allow gas to pass through the annular space between the two.

c. An outer housing, also of cylindrical shape, that is fixed with an end plate in the shape of a washer. The outer diameter of the end plate is the same as that of the outer housing, and the inner diameter equals the diameter of the central electrode. The end plate may be fixed to the outer housing by welding, attachment using threads, or be machined as an integral part of the housing.

When assembled, the inner electrode stops short of the end plate by several millimetres so that a cavity is formed between the inner electrode and the end plate, (i.e. a blind cavity). The length of the cavity can be adjusted in length by a suitable mechanism, e.g. a turnbuckle arrangement.

2. The Electrical System. This system contains two essential parts:

a. A high voltage (10's of kV) short duration (10 us) low energy (<1 Joule) trigger source similar to an automobile ignition system.

b. A lower voltage (0.8 to 5 KV) higher energy (1-10-$^3$Joules) discharge source consisting mainly of a suitable number of storage capacitors. The discharge source is protected from the trigger source high voltage by a blocking inductor or diode.

3. The Mounting Structure. This structure contains the plasma jet system and may contain all or part of the electrical system depending on the type of application. It also forms the protection barrier between the above two systems and the marine environment and to allow the supply of gas into the plasma cavity.

Thus, by embodiments of this invention, a plasma jet underwater acoustic source (PJUAS) has been provided which differs from existing acoustic source devices in that the discharge takes place in a gaseous-filled, cylindrical cavity closed at one end and open at the opposite end into the water. The gas to the cavity is supplied by an external source. Heating the gas in the cavity to the plasma state by the electrical discharge results in a large overpressure in the cavity.

In one embodiment of the present invention, the length of the acoustic pulse and hence its spectral content can be controlled to an extent by the size of the plasma cavity and by the capacitance, inductance, and resistance of the electrical circuit that produces the plasma discharge in the cavity. The cavity size of that embodiment can be adjusted in length from 2 mm to 30 mm, and in diameter from 1 mm to 5 mm. For a particular power supply and plasma cavity size the values of inductance, and resistance are nominally fixed. The acoustic pulse is then most easily controlled by varying the storage capacitance. The amplitude of the acoustic pulse is controlled by the voltage applied to the storage capacitors.

BRIEF DESCRIPTION OF THE DRAWINGS

In the accompanying drawings,

FIG. 1 is a schematic representation of one embodiment of the pulsed plasma jet underwater acoustic source of this invention;

FIG. 2 is a block diagram of an electrical system suitable for use with the pulsed plasma jet underwater acoustic source of one embodiment of this invention;

Figure 3:
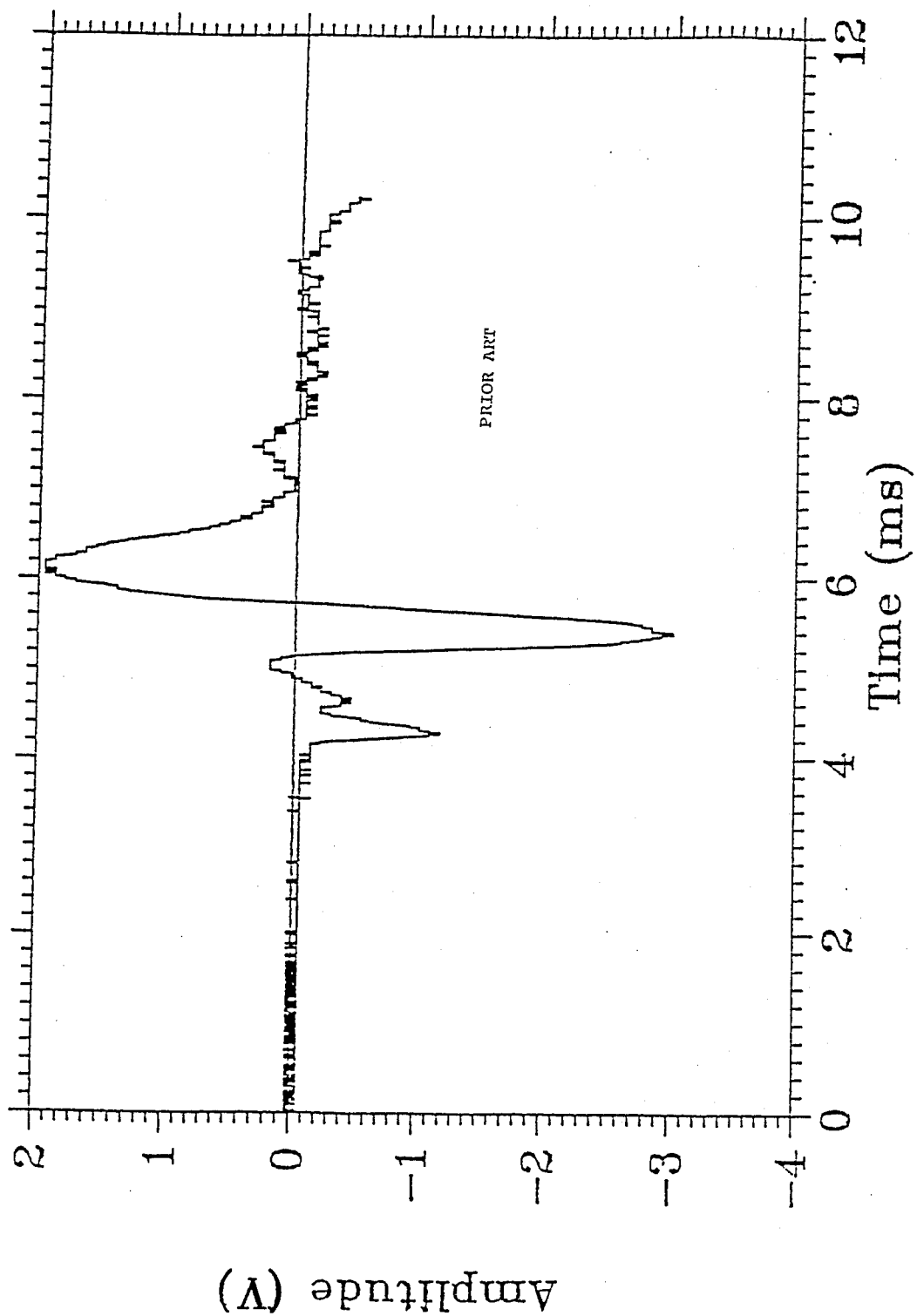
FIG. 3 (labelled PRIOR ART) is a graph of amplitude in V as ordinate and time in ms as abscissa of a pressure pulse generated by a 1" air gun and a single hydrophone at 21 m.

DESCRIPTION OF PREFERRED EMBODIMENTS (i) Description of FIG. 1

FIG. 1 shows the schematic view of the plasma jet underwater acoustic source 10 of principles of this invention. The plasma jet underwater acoustic source 10 includes a main hollow body 30 to which is secured a hollow cylindrical outer housing 11 formed of an electrically-conductive material, e.g. metal. Outer housing 11 includes an upper flange 12 and a lower, centrally-apertured end plate 25 grounded at 26. The interior of the outer housing 11 is filled with an electrically-insulating cylinder 13 e.g. made of the material known by the Trade Mark TEFLON. Cylinder 13 is provided with a central longitudinal bore 15. The outer housing 11 is secured by flange 12 to the hollow cylindrical main body 30.

Disposed along the central longitudinal axis of the cylinder 13 is a threaded electrode rod 14, which is secured to an internally threaded connector 24. The lower cylindrical chamber between the centrally apertured end plate 25 and the end of the electrode rod 14 provides a cylindrical plasma cavity 22. Threaded connector 24 allows the overall length of the electrode 14 to be changed, which also changes the length of plasma cavity 22. A plug 16 connects an electrical circuit (not shown in this Figure but shown in block form in FIG. 2,) via conductor 33. All connectors pass through body 30 via an insulating bushing 23, which protects the system from the marine environment. Other watertight, air-conducting passageways (not shown) attach at bushing 23.

Also connected to hollow cylindrical main body 30 is the outlet line 20 of a gas supply cylinder 21. Gas flow to the interior of hollow cylindrical main body 30 through gas outlet line 20 is controlled by valve 19. Gas enters the cylindrical plasma cavity 22 through annular conduit 17 between the central longitudinal bore 15 through cylinder 13 and electrode rod 14.

(ii) Description of FIG. 2

FIG. 2 is a block diagram of one embodiment of an electrical system for use in the plasma jet underwater acoustic source of this invention. The electrical system comprises a trigger source 210 that supplies a high voltage pulse to the plasma jet underwater acoustic source 10 via lines 211 and 33 that breaks down the gas in the cavity 230 of the plasma jet underwater acoustic source 10, thus creating a plasma discharge. The discharge source 220 enhances this discharge by supplying a lower voltage high current, via lines 221 and 33 to produce a fully developed arc.

There are many circuits that can provide the trigger source 210. One such current could comprise a pulse generator driving an ignition coil, the secondary of which is connected to a terminal of a spark gap, the other terminal of which is connected to one terminal (i.e. the electrode 14) of the plasma jet underwater acoustic source 10.

There are also many circuits that can provide the discharge source 220. One such circuit could comprise a series inductance and a storage capacitor connected in parallel to the other terminal of the trigger source 210. The storage capacitor is charged from a DC power supply via a resistor. The other terminal of the plasma jet underwater acoustic source 10 is connected to common ground 26.

FIG. 2 also shows the gas supply cylinder 21, with gas line 20 provided with valve 19 to feed the hollow main cylindrical body 30.

OPERATION OF PREFERRED EMBODIMENTS (i) Operation of Embodiment of FIG. 2

In operation, a pulse from the pulse generator trigger source 210 is generated to provide a voltage across the plasma jet underwater acoustic source 10 which is high enough for ionization of the gas in the plasma cavity. Once ionization occurs, a plasma is maintained by the charge from discharge source 220. Thus an acoustic pulse is generated by the plasma jet underwater acoustic source 10.

In use, gas feeds into the plasma cavity 22 via the annular region 17 between the central electrode rod 14 and the insulator 13.

Electrical operation proceeds as follows: The short duration trigger source causes the gas in the cavity to breakdown into a conducting plasma. This creates a conductive path for the charge stored in the discharge source to produce a fully developed electrical arc within the cavity heating the gas inside to 10's of thousands kelvin temperature.

The acoustic energy develops when the heated expanding gas in the plasma cavity is expelled through the hole in the end plate of the outer housing into the surrounding water. The gas pressure forms a driving piston that creates an acoustic pulse radiating into the water.

A pulsed plasma jet underwater acoustic source of one embodiment of this invention allowed gas flow into the cylindrical ignition cavity. The gaseous environment in the cavity allows the device to be fired when submerged in water using only moderate voltages (hundreds of volts) on the storage capacitors.

(ii) Description of FIGS. 3, 4, 5 and 6

Figure 4:
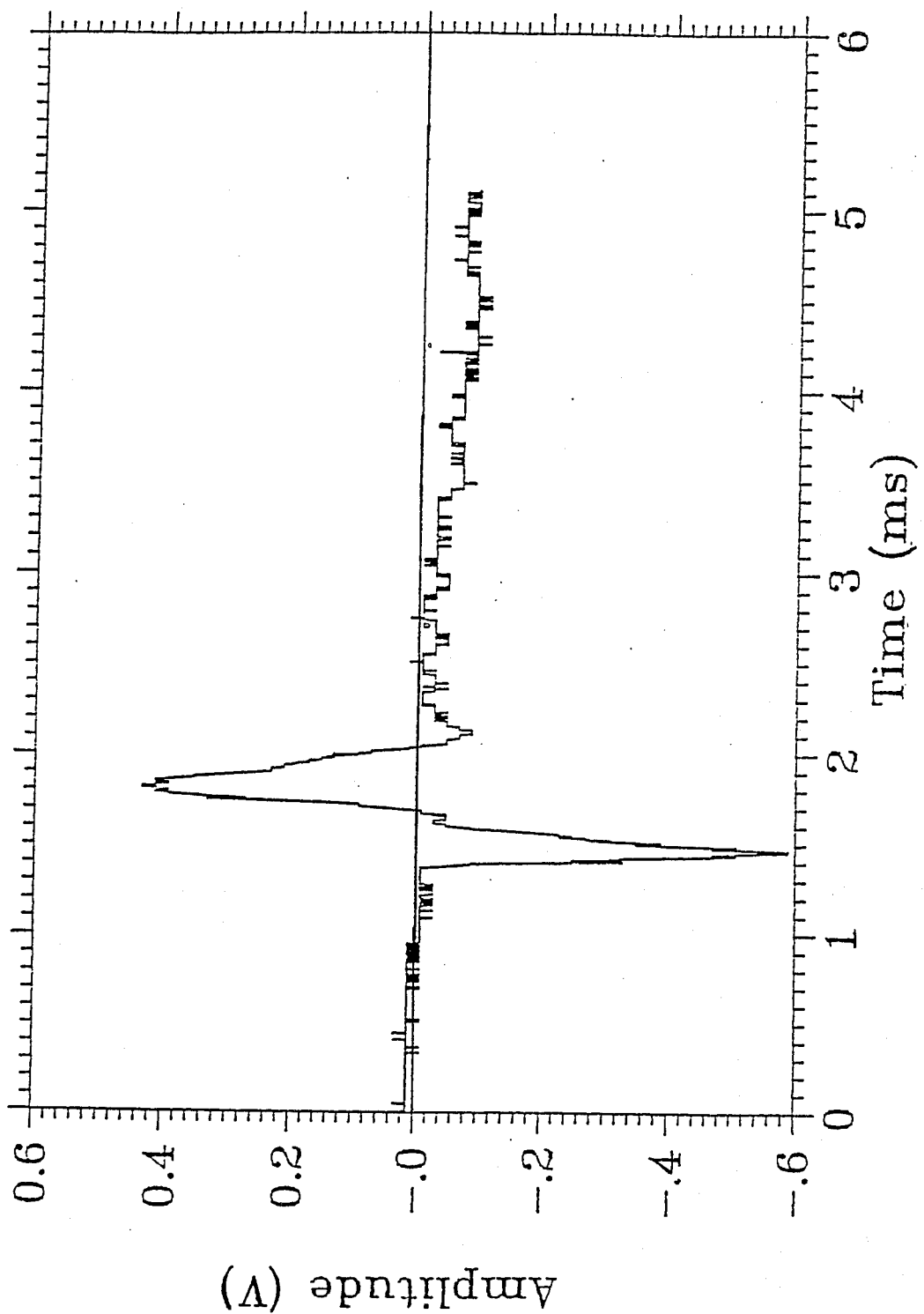
FIG. 4 is a graph of amplitude in V as ordinate and time in ms as abscissa of a pressure pulse generated by a plasma jet underwater acoustic source according to one embodiment of this invention and a single hydrophone at 24 m.
Figure 5:
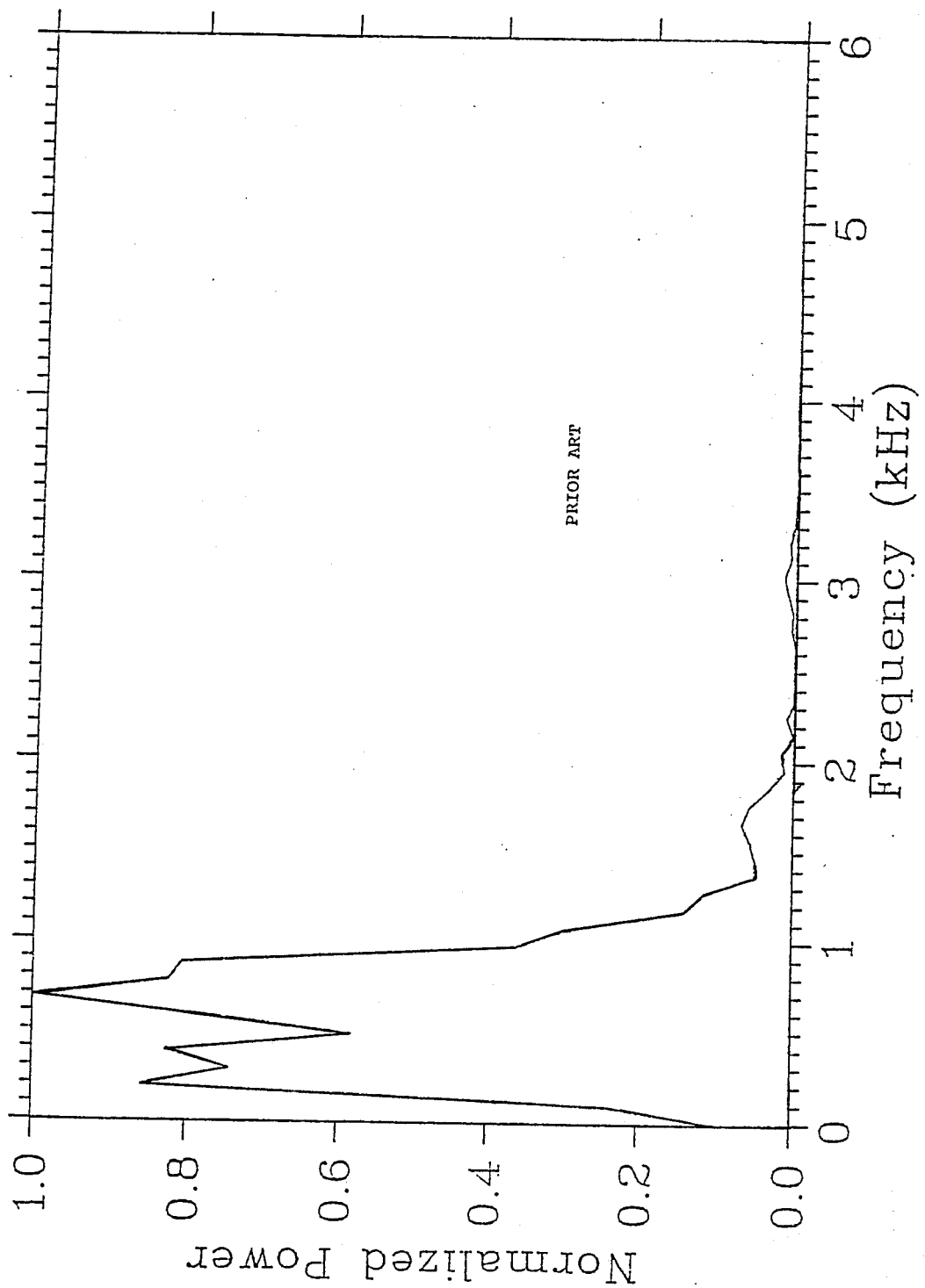
FIG. 5 (labelled PRIOR ART) is a graph of normalized power as ordinate and frequency in kHz as abscissa of the fast Fourier transfer of a pressure pulse produced by a 1" air gun.
Figure 6:
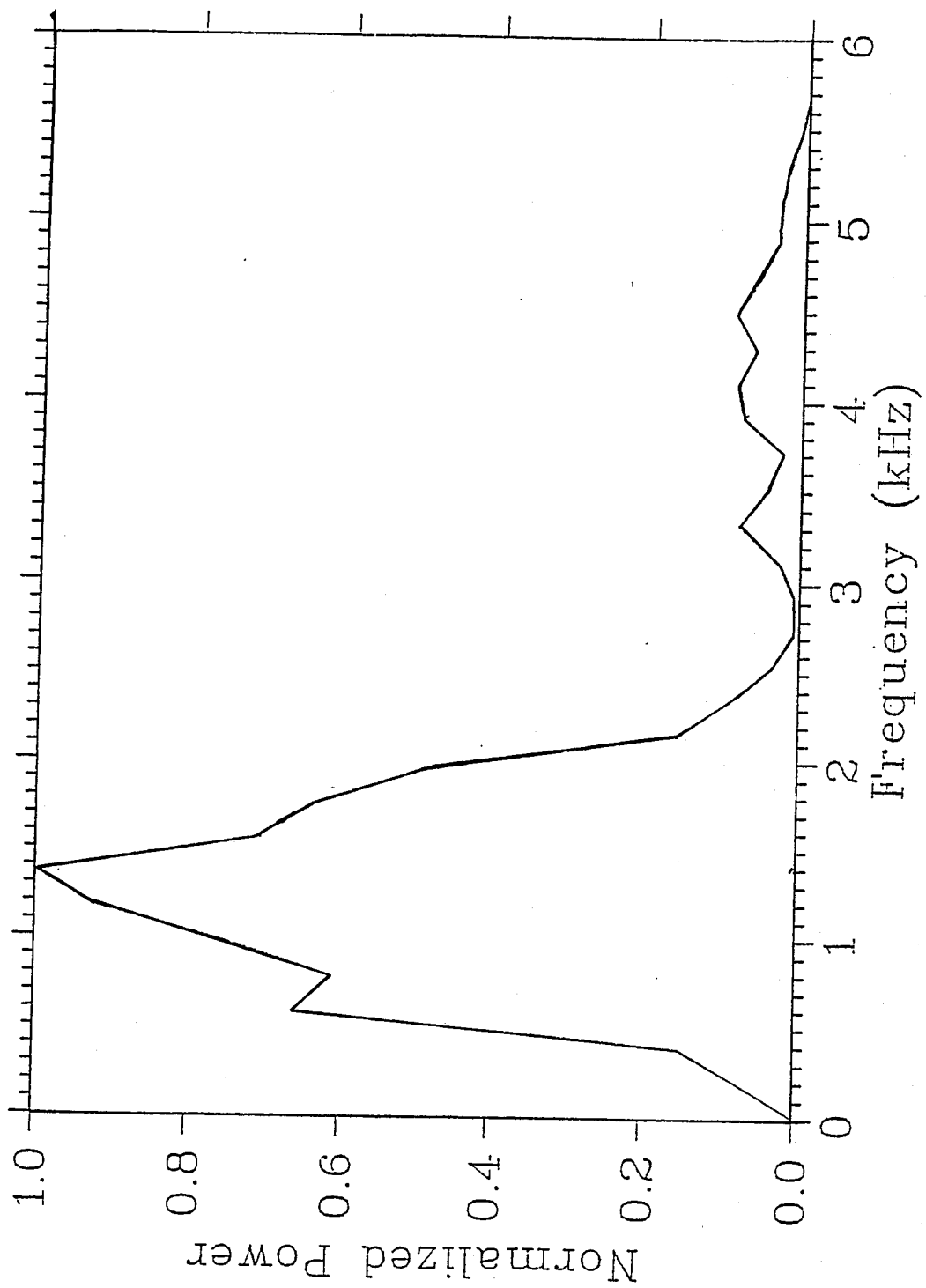
FIG. 6 is a graph of normalized power as ordinate and frequency in kHz as abscissa of the fast Fourier transfer of a pressure pulse produced by a plasma jet underwater acoustic source according to one embodiment of this invention.

The acoustic signature of the acoustic pulses generated by the plasma jet underwater acoustic source can be seen in FIGS. 4 and 6 and its essential characteristics can be compared with the acoustic signature of acoustic pulses produced by a 1" air gun, an acoustic source of the prior art shown in FIGS. 3 and 5. As seen in FIG. 4, the pulse is a clean pulse with primary and secondary high amplitude, very fast pulses at 1.4 to 2.1 ms with very little indication of a preliminary pulse or subsequent pulses. On the other hand, as seen in FIG. 3, the pulse produced according to a source of the prior art while having primary and secondary pulses produces such pulses of considerably lower amplitude, is not as fast, namely at 4.1 to 6.5 ms with indications of considerable preliminary pulses and subsequent pulses. This indicates that the plasma jet underwater acoustic source of aspects of the present invention is much more efficient at producing underwater acoustic pulses. Moreover, the advantages are even more apparent when it is realized that the energy-producing requirements for a 1" air gun include a working platform on a 50 ft. tug, while the energy-producing requirements for the plasma jet underwater acoustic source of aspects of this invention are so small that it can be carried by a human.

FIGS. 6 and 5 respectively again show the greater efficiency of the acoustic pulses produced by the plasma jet underwater acoustic source of an aspect of the present invention compared to those produced by an air gun of the prior art. The frequency is more uniform and less jagged compared to the prior art, when analyzed by a fast Fourier transfer.

The existence of a bubble pulse and the development of a plasma plume was also confirmed using high speed photography.

Figure 7:
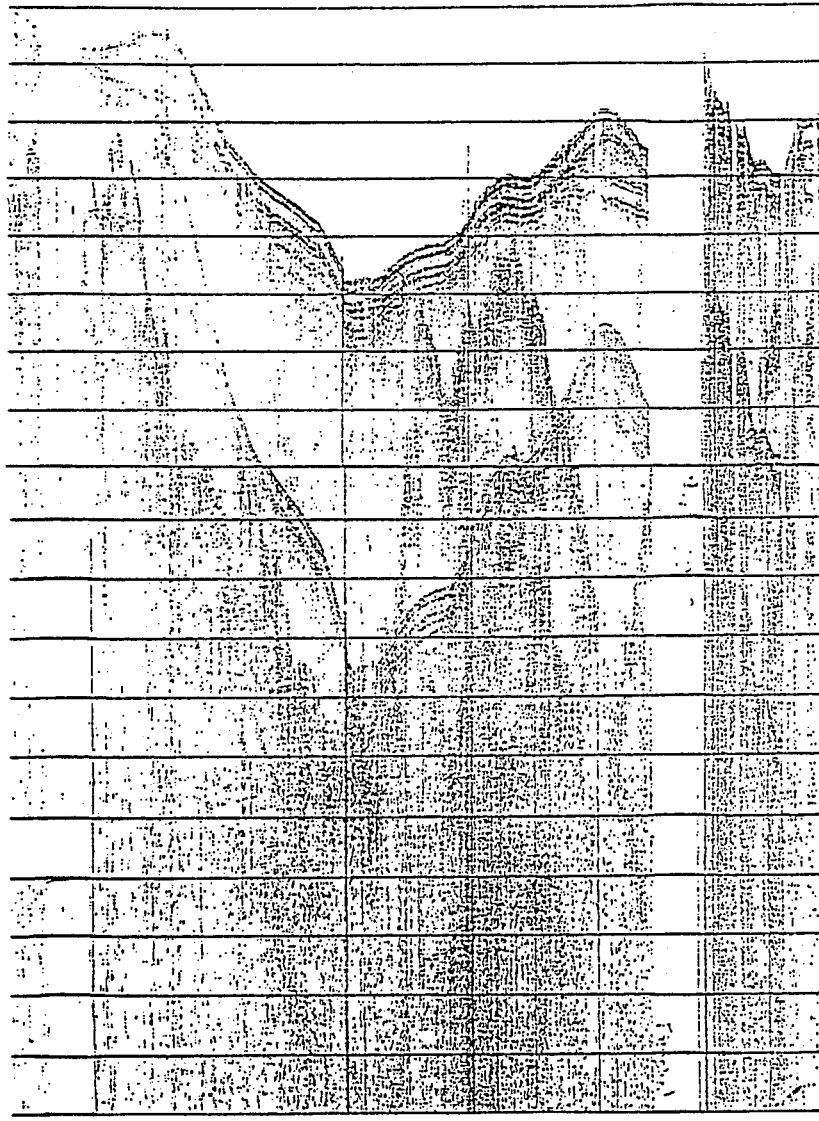
FIG. 7 is a profile of the bottom surface of a section of Cadboro Bay, British Columbia generated by means of pressure pulses produced by a plasma jet underwater acoustic source according to one embodiment of this invention.

(iii) Description of FIG. 7

FIG. 7 shows the results of the use of the plasma jet underwater acoustic source of an aspect of this invention to provide an ocean bottom profile similar to that produced using an acoustic source according to the prior art. The actual bottom profile is shown, as are echos produced from mud at the bottom and by sub surface rock formations. This can thus be a valuable tool for commercial dredging and/or pile driving applications. Moreover, because the frequency can be tuned, the acoustic energy produced using the plasma jet underwater acoustic source of aspects of this invention can be tailored at will.

COMPARISON WITH DEVICES OF THE PRIOR ART

Conventional underwater arc devices, often called sparkers, have been in use for geophysical studies for many years. The pulsed plasma jet underwater acoustic source of aspects of this invention has the advantage over such sparkers in operating at significantly less hazardous voltage levels, has much lower electrode erosion, and operates at higher thermal efficiencies.

The voltages required by the plasma jet underwater acoustic source of aspects of this invention are considerably less than those needed in the prior art devices, since this acoustic source, although underwater, relies on an electrical breakdown of a gas. The overpressure produces a driving piston effect that creates an acoustic pulse propagating into the surrounding water environment. All of the sparker devices of the prior art and the plasma jet underwater acoustic source of aspects of the present invention produce a gaseous bubble that coincides with the beginning of the electrical discharge. This bubble expands to its maximum size in a few milliseconds and then collapses. In collapsing, secondary and possibly subsequent bubble acoustic pulses are created that for many reasons are undesirable. However, with the plasma jet underwater acoustic source of aspects of the present invention, those secondary pulses are suppressed or substantially eliminated by the plasma plume that follows the bubble.

It is now known that a pulsed plasma device in air has a much better thermal efficiency than a conventional spark gap (10% vs. 1%). A pulsed plasma source should, therefore, be able to radiate ten times as much acoustic energy as a conventional spark gap, a result of delivering a greater portion of the stored energy to heat the gas. This should provide a superiority of a pulsed plasma source over the conventional spark gap when the same energy is used.

Gas scavenging of the plasma jet cavity can produce the desired low breakdown characteristics even with the source under water. The low voltage requirement for pulsed plasma sources and their ability to operate at high repetition rates (up to 1 KHz), together with their inherent greater thermal efficiencies, makes these potentially very attractive underwater acoustic sources. An added advantage would be that reliable acoustic sources with reasonably high repetition rates would allow phase sensitive detection of the acoustic signal and thus effective enhancement of the signal-to-noise ratio of up to $10^3$ to be obtained.

This acoustic source, like other electric arc sources, should therefore produce a sharp pressure pulse that, in turn, should produce a wide frequency acoustic spectrum useful to profile underwater objects and geological strata with moderately high resolution.

CONCLUSION

From the foregoing description, one skilled in the art can easily ascertain the essential characteristics of this invention, and without departing form the spirit and scope thereof, can make various changes and modifications of the invention to adapt it to various usages and conditions. Consequently, such changes and modifications are properly, equitably, and "intended" to be, within the full range of equivalence of the following claims.

What we claim is:

1. A plasma jet source for a plasma jet underwater acoustic source, said plasma jet source comprising:
   (a) a central electrode;
   (b) a concentric insulator having a longitudinal bore to accomodate said central electrode, said bore being spaced from said central electrode by a longitudinally-extending annular chamber;
   (c) a plasma cavity bounded at its upper end by said central electrode, said plasma cavity being in communication with said annular chamber;
   (d) an outer housing of electrically-conductive material surrounding said insulator and terminating in a centrally-apertured end plate whose central aperture provides an extension to said plasma cavity, said end plate being adapted to be grounded;
   (e) means for connecting said annular chamber to a source of gas; and
   (f) means for connecting said central electrode to a source of low energy and high voltage to create an electrical discharge across the gas within said cavity and then for connecting said electrode to electrical energy of comparatively low voltage in the range of hundreds of volts.

2. The plasma jet source of claim 1 including means for adjusting the length of said electrode within said concentric insulator, thereby to vary the length of said plasma cavity.

3. The plasma jet source of claim 1 wherein said adjusting means comprises an internally threaded coupling connecting a threaded end of the electrode to an electrical connector, whereby rotation of said coupling moves said electrode.

4. The plasma jet source of claim 1 including a main hollow outer body connected to a source of gas, whereby said gas may flow to said annular chamber from said main hollow outer body.

5. The plasma jet source of claim 4 wherein said electrode is connected to an electrical connector which terminates in a banana plug within said hollow outer body, whereby said electrical connector may be electrically connected to said source of electricity.

6. The plasma jet source of claim 1 wherein said central electrode is made of a refractory metal of cylindrical shape.

7. The plasma jet source of claim 1 wherein said concentric insulator is formed of glass, ceramic, nylon or polytetrafluoroethylene, and is of cylindrical shape.

8. The plasma jet source of claim 1 wherein said gas is air.

9. The plasma jet source of claim 1 wherein said outer housing is made of a non-corrosive metal.

10. A plasma jet underwater acoustic source comprising:
    (A) a plasma jet source comprising
       (a) a central electrode;
       (b) a concentric insulator having a longitudinal bore to accomodate said central electrode, said bore being spaced from said central electrode by a longitudinally extending annular chamber;
       (c) a plasma cavity bounded at its upper end by said central electrode, said plasma cavity being in communication with said annular chamber;
       (d) an outer housing of electrically-conductive material surrounding said insulator and terminating in a centrally-apertured end plate whose central aperture provides a coextensive extension to said plasma cavity, said end plate being adapted to be grounded; and
       (e) means for connecting said annular chamber to a source of gas;
    and
    (B) an electrical system connected to said central electrode,, said electrical system comprising
       (f) a trigger pulse source comprising a low energy high voltage trigger pulse to induce gas breakdown in said plasma cavity, and a discharge source of a lower voltage higher energy discharge comprising a low voltage storage capacitor, to produce a fully developed arc.

11. The plasma jet underwater acoustic source of claim 10 wherein said source of pulsed comparatively low voltage is adapted to generate voltage of 0.8 to 5 KV.

12. The plasma jet underwater source of claim 10 operable either at a single shot use over a range of energies of $1-10^3$ J or at repetitive rate of up to 2 KHz.

13. The plasma jet underwater acoustic source of claim 11 wherein said trigger pulse is adapted to produce a high voltage (10's of KV), short duration (10 us) low energy (<1 Joule) electrical energy.

14. The plasma jet underwater acoustic source of claim 11 wherein said discharge source is adapted to produce a lower voltage (0.8 to 5 KV), higher energy ($1-10^3$ Joules) discharge source.

15. The plasma jet underwater acoustic source of claim 11 wherein said discharge source comprises a plurality of storage capacitors.

16. The plasma jet underwater acoustic source of claim 11 wherein said discharge source is protected from said trigger source by a blocking inductor or diode.

17. The plasma jet underwater acoustic source of claim 10 including a mounting structure to contain the entire plasma jet source and all or part of the electrical system, thereby to provide a protective barrier between the plasma jet underwater acoustic source and the marine environment and to allow the supply of gas into the plasma cavity.

18. A method for the production of underwater sound which comprises:
 (a) providing a source of gas in a confined, single, open-ended plasma cavity bounded at one end by an electrical electrode and at the other end by an apertured grounded washer;
 (b) applying a low energy and high voltage field across the electrode and the grounded end plate to create an electrical discharge across the gas; and and
 (c) then applying a low voltage electric field across the electrode and the grounded washer to subject the gas to an overpressure to expel the gas initially at supersonic speeds from the cavity
whereby the ejected gas forms a compression zone, a bubble and a plasma plume, said compression zone thereby producing an acoustic pulse.

19. The method of claim 18 wherein said low energy, high voltage electric field is a high voltage (10's of KV), short duration (10 us) low energy ($<1$ Joule) trigger source of electrical energy; and wherein said low voltage electric field is a lower voltage (0.8 to 5 KV), higher energy ($1-10^3$ Joules) discharge source of electrical energy.

* * * * *